US012628230B2

(12) United States Patent
Song et al.

(10) Patent No.: US 12,628,230 B2
(45) Date of Patent: May 12, 2026

(54) BEAM FAILURE RECOVERY METHOD AND APPARATUS, TERMINAL, AND STORAGE MEDIUM

(71) Applicant: VIVO MOBILE COMMUNICATION CO., LTD., Dongguan (CN)

(72) Inventors: Yang Song, Dongguan (CN); Yu Yang, Dongguan (CN); Yitao Mo, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 301 days.

(21) Appl. No.: 18/138,032

(22) Filed: Apr. 21, 2023

(65) Prior Publication Data

US 2023/0262820 A1     Aug. 17, 2023

Related U.S. Application Data

(63) Continuation of application No. PCT/CN2021/124976, filed on Oct. 20, 2021.

(30) Foreign Application Priority Data

Oct. 23, 2020     (CN) .......................... 202011149209.6

(51) Int. Cl.
*H04W 76/19* (2018.01)
*H04B 7/06* (2006.01)
(Continued)

(52) U.S. Cl.
CPC ............ *H04W 76/19* (2018.02); *H04B 7/088* (2013.01); *H04W 24/08* (2013.01)

(58) Field of Classification Search
CPC ..... H04W 76/19; H04W 24/08; H04W 24/04; H04W 72/046; H04W 72/21; H04B 7/088;
(Continued)

(56) References Cited

U.S. PATENT DOCUMENTS 10,813,157 B1     10/2020  Bai et al.
11,582,793 B2 *   2/2023   Jiang ................. H04W 74/0833
(Continued)

FOREIGN PATENT DOCUMENTS

CN          110536436 A     12/2019
CN          110896546 A      3/2020
(Continued)

OTHER PUBLICATIONS

International Search Report issued in corresponding International Application No. PCT/CN2021/124976, mailed Jan. 6, 2022, 4 pages.
(Continued)

*Primary Examiner* — Harry H Kim
(74) *Attorney, Agent, or Firm* — IPX PLLC

(57) ABSTRACT

A beam failure recovery method and apparatus, a terminal, and a storage medium, are provided. The method includes: triggering a beam failure event in a first condition; and sending a Beam Failure Recovery reQuest (BFRQ) in a case that the beam failure event occurs, where the first condition and/or the BFRQ are/is related to M Beam Failure Detection Reference Signal BFD RS groups, and M is a positive integer greater than 1.

18 Claims, 4 Drawing Sheets

(51) Int. Cl.

| | |
|---|---|
| *H04B 7/08* | (2006.01) |
| *H04L 5/00* | (2006.01) |
| *H04W 24/04* | (2009.01) |
| *H04W 24/08* | (2009.01) |
| *H04W 72/044* | (2023.01) |
| *H04W 72/21* | (2023.01) |

(58) Field of Classification Search

CPC ............ H04B 7/06968; H04B 7/06964; H04L 5/0048; H04L 5/0053

See application file for complete search history.

(56) References Cited

U.S. PATENT DOCUMENTS

| | | | | |
|---|---|---|---|---|
| 11,791,888 | B2 * | 10/2023 | Liou | .................. H04B 7/06964 370/329 |
| 11,843,559 | B2 * | 12/2023 | Zhang | .................. H04B 7/0695 |
| 11,950,112 | B2 * | 4/2024 | Lo | ...................... H04B 7/06964 |
| 12,113,742 | B2 * | 10/2024 | Zhang | .................. H04L 5/0051 |
| 12,191,962 | B2 * | 1/2025 | Yang | ..................... H04W 72/23 |
| 2021/0105765 | A1 * | 4/2021 | Cirik | ................... H04B 7/0695 |
| 2021/0105850 | A1 * | 4/2021 | Bai | ....................... H04W 16/28 |
| 2022/0173788 | A1 * | 6/2022 | Kang | ..................... H04B 7/088 |
| 2023/0006727 | A1 * | 1/2023 | Jang | ................... H04B 7/06964 |
| 2023/0284198 | A1 * | 9/2023 | Song | .................. H04W 72/231 370/252 |
| 2024/0064839 | A1 * | 2/2024 | Xu | ........................ H04W 36/06 |

FOREIGN PATENT DOCUMENTS

| | | | |
|---|---|---|---|
| CN | 110943817 | A | 3/2020 |
| CN | 111278122 | A | 6/2020 |
| CN | 111567081 | A | 8/2020 |
| CN | 111586862 | A | 8/2020 |
| WO | 2020034567 | A1 | 2/2020 |

OTHER PUBLICATIONS

First Office Action issued in related Chinese Application No. 202011149209.6, mailed Sep. 21, 2024, 8 pages.

Nokia et al, "On PDCCH-based power saving techniques", 3GPP TSG RAN WG1 meeting #99 R1-19131111, Nov. 2019, 11 pages.

Extended European Search Report issued in related European Application No. 21882052.0, mailed Jun. 17, 2024, 16 pages.

* cited by examiner

Network device

Terminal

BEAM FAILURE RECOVERY METHOD AND APPARATUS, TERMINAL, AND STORAGE MEDIUM

CROSS-REFERENCE TO RELATED APPLICATIONS

This application is a continuation of International Application No. PCT/CN2021/124976, filed on Oct. 20, 2021, which claims priority to Chinese Patent Application No. 202011149209.6, filed on Oct. 23, 2020. The entire contents of each of the above-identified applications are expressly incorporated herein by reference.

TECHNICAL FIELD

This application relates to the field of communications technologies, and in particular, to abeam failure recovery method and apparatus, a terminal, and a storage medium.

BACKGROUND

In a high-frequency band communications system, because a wavelength of a wireless signal is relatively short, a case that the signal is blocked or the like tends to occur during propagation, and consequently signal propagation is interrupted, for example, a beam failure. However, a current Beam Failure Recovery (BFR) mechanism is mainly for beam failure recovery of a single Transmission Reception Point (TRP). That is, the current beam failure recovery mechanism can only be applied to beam failure recovery of a single Beam Failure Detection Reference Signal (BFD RS) scenario, and consequently, a beam failure recovery effect of a terminal is relatively poor.

SUMMARY

This application provides a beam failure recovery method and apparatus, a terminal, and a storage medium.

According to a first aspect, an embodiment of this application provides a beam failure recovery method, performed by a terminal and including:

triggering a beam failure event in a first condition; and sending a beam failure recovery request (Beam Failure Recovery Request, BFRQ) in a case that the beam failure event occurs, where the first condition and/or the BFRQ are/is related to M beam failure detection reference signal BFD RS groups, and M is a positive integer greater than 1.

According to a second aspect, an embodiment of this application provides a beam failure recovery apparatus, including:

a trigger module, configured to trigger a beam failure event in a first condition; and a sending module, configured to send a beam failure recovery request BFRQ in a case that the beam failure event occurs, where the first condition and/or the BFRQ are/is related to M beam failure detection reference signal BFD RS groups, and M is a positive integer greater than 1.

According to a third aspect, an embodiment of this application provides a terminal, including a memory, a processor, and a program or an instruction that is stored in the memory and that can be run on the processor, where the program or the instruction is executed by the processor to implement the steps of the beam failure recovery method.

According to a fourth aspect, an embodiment of this application provides a readable storage medium. The readable storage medium stores a program or an instruction, and the program or the instruction is executed by a processor to implement the steps of the beam failure recovery method.

According to a fifth aspect, a program product is provided. The program product is stored in a non-volatile storage medium, and the program product is executed by at least one processor to implement the steps of the beam failure recovery method.

In the embodiments of this application, a beam failure event is triggered in a first condition; and a beam failure recovery request BFRQ is sent in a case that the beam failure event occurs, where the first condition and/or the BFRQ are/is related to M beam failure detection reference signal BFD RS groups, and M is a positive integer greater than 1.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first," "second," and the like are intended to distinguish between similar objects but do not describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a New Radio (NR) system for example purposes, and NR terms are used in most of the following descriptions, but these technologies can also be applied to an application other than an NR system application, for example, a $6^{th}$ Generation (6G) communications system.

Figure 1:
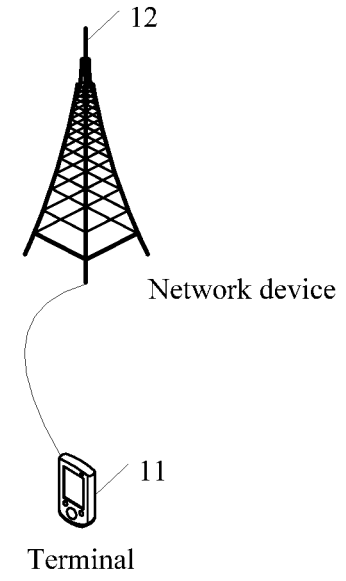
FIG. 1 is a block diagram of a wireless communications system to which embodiments of this application can be applied.

FIG. 1 is a block diagram of a wireless communications system to which embodiments of this application can be applied. The wireless communications system includes a terminal 11 and a network device 12. The terminal 11 may also be referred to as a terminal device or User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), Vehicle User Equipment (VUE), Pedestrian User Equipment (PUE), or RedCap UE. The RedCap UE may include a wearable device, an industrial sensor, a video surveillance device, and the like, and the wearable device includes a bracelet, a headset, glasses, and the like. It should be noted that a specific type of the terminal 11 is not limited in the embodiments of this application.

The network device 12 may be a base station or a core network. The base station may be referred to as a NodeB, an evolved NodeB (eNB), an access point, a Base Transceiver Station (BTS), a radio base station, a radio transceiver, a Basic Service Set (BSS), an Extended Service Set (ESS), a home NodeB, a home evolved NodeB, a WLAN access point, a Wi-Fi node, a Transmission Reception Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

In addition, the embodiments of this application may be applied to scenarios in which a broadcast/multicast feature is supported, for example, public safety and mission critical, V2X applications, transparent IPv4/IPv6 multicast delivery, IPTV, software delivery over wireless, and group communications and Internet of Things application. Certainly, the embodiments of this application set no limitation thereto. For example, the embodiments of this application may be further applied to another unicast scenario.

With reference to the accompanying drawings, a beam failure recovery method and apparatus, a terminal, and a storage medium provided in the embodiments of this application are described in detail by using specific embodiments and application scenarios.

Figure 2:
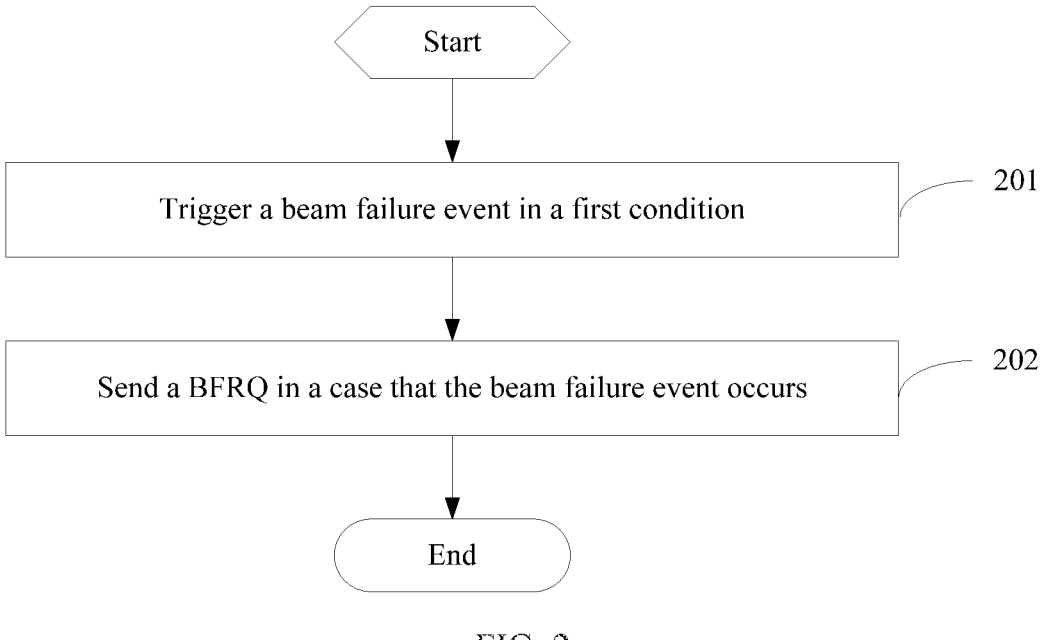
FIG. 2 is a flowchart of a beam failure recovery method according to an embodiment of this application.

Referring to FIG. 2, FIG. 2 is a flowchart of a beam failure recovery method according to an embodiment of this application. The method is performed by a terminal. As shown in FIG. 2, the method includes the following steps.

Step 201: Trigger a beam failure event in a first condition.

In some implementations, the first condition includes:

a beam failure occurs on each BFD RS in any BFD RS group in the M BFD RS groups; or a beam failure occurs on any BFD RS in the M BFD RS groups; or a beam failure occurs on all BFD RSs in each BFD RS group in the M BFD RS groups, where the M BFD RS groups are obtained by classifying a plurality of BFD RSs corresponding to the terminal, M is a positive integer greater than 1, and that a beam failure occurs on an BFD RS means that a quality detection result of the BFD RS is lower than a corresponding first preset threshold.

The first condition may be configured by a network side, or may be agreed upon in a protocol. This is not limited in this embodiment of this application.

The plurality of BFD RSs may be a plurality of BFD RSs of the terminal in a Multi-Transmission Reception Point (MTRP) scenario, where the MTRP may include an MTRP of Multi-Downlink Control Information (M-DCI) or Single Downlink Control Information (S-DCI). Further, when the terminal is configured with a plurality of TRP identifiers, the terminal works in an MTRP mode of the M-DCI, where a TRP identifier may be a COntrol REsource SET Pool Index (CORESETPoolIndex), or certainly, may be another identifier. This is not limited. When at least one TCI code point in Transmission Configuration Indication (TCI) code points of a Physical Downlink Shared CHannel (PDSCH) activated by a Media Access Control Control Element (MAC CE) configured for the terminal corresponds to at least two TCI states, the terminal may work in an MTRP mode of S-DCI.

Each BFD RS group may include one or more BFD RSs, and different BFD RS groups may include a same quantity of BFD RSs or different quantities of BFD RSs.

For example, if the network side configures a plurality of different CORESETPoolIndex values, grouping may be performed according to CORESETPoolIndex of COntrol REsource SETs (CORESETs) corresponding to BFD RSs, that is, BFD RSs with a same CORESETPoolIndex value associated with the CORESETs corresponding to the BFD RSs belong to a same BFD RS group, and BFD RSs with different CORESETPoolIndex values associated with the CORESETs corresponding to the BFD RSs belong to different BFD RS groups. In some implementations, this grouping manner may be applied to a MTRP scenario of the M-DCI, and a plurality of different CORESETPoolIndex values may be configured in this scenario.

For another example, a network side device may directly configure grouping of BFR RSs. For example, a BFR RS group number may be explicitly configured for the terminal, and is visible to a Media Access Control (MAC) layer of the terminal. In some implementations, this grouping manner is applicable to both the MTRP of the M-DCI and the MTRP of the S-DCI. In this way, the terminal does not need to distinguish whether a system configures the M-DCI or the S-DCI for the terminal, provided that M BFD RS groups are configured, and the terminal performs a beam failure procedure according to subsequent steps.

Further, one BFD RS group may correspond to one or more TRPs, and one BFD RS group may include BFD RSs corresponding to one or more beams.

Step 201 may be performed to trigger the beam failure event if a beam failure occurs on each BFD RS in any BFD RS group, or trigger the beam failure event if a beam failure occurs on any BFD RS in the M BFD RS groups, where it may be determined if a beam failure occurs on a BFD RS, that a beam failure occurs in a corresponding BFD RS group; or trigger the beam failure event if a beam failure occurs on all BFD RSs in each BFD RS group in the M BFD RS groups, that is, a beam failure occurs on all BFD RSs. In addition, in this embodiment of this application, a configuration parameter may further be used to indicate that the beam failure event is triggered if a group of BFD RSs or one BFD RS fails.

In this embodiment of this application, the M BFD RS groups may respectively correspond to M first preset thresholds. In addition, first preset thresholds corresponding to all BFD RS groups may be the same or different. That is, each BFD RS group is separately configured with a corresponding first preset threshold, so that a beam failure detection effect can be improved. In this embodiment of this application, in some scenarios, the M BFD RS groups may be uniformly configured with a first preset threshold.

Step 202: Send a beam failure recovery request BFRQ in a case that the beam failure event occurs.

The first condition and/or the BFRQ are/is related to M beam failure detection reference signal BFD RS groups, and M is a positive integer greater than 1.

This step may be: counting a quantity of beam failure event times by using a beam failure counter and a timer, and sending the BFRQ when the quantity of times reaches a specific value, to perform beam recovery. In this embodiment of this application, the BFRQ is sent provided that the beam failure event is triggered. The sending a BFRQ may be sending the BFRQ to a network device. That the BFRQ is related to the M BFD RS groups may be: the BFRQ includes information about the M BFD RS groups, for example, includes information about a BFD RS group in which a beam failure occurs.

In this embodiment of this application, through the foregoing steps, beam failure recovery can be performed in a plurality of BFD RS scenarios, thereby improving a beam failure recovery effect of a terminal. For example, in an MTRP scenario, beam failure recovery can be implemented for both the MTRP of the S-DCI and the MTRP of the M-DCI, the BFRQ is reliably and quickly sent in a case that a beam failure occurs in a part of some TRPs, and information about a TRP that fails is reported.

In some implementations, each BFD RS group corresponds to one or more of the following configurations:

a first Physical Uplink Control CHannel (PUCCH), a Random Access CHannel (RACH) resource, and a candidate beam set.

In this implementation, a separate first PUCCH may be configured for each BFD RS group, for example, a first PUCCH BFR. A separate RACH resource may be configured for each BFD RS group, and a separate candidate beam set may be configured for each BFD RS group. In this way, in a case that a beam failure occurs in a BFD RS group, the BFRQ may be sent by using a corresponding first PUCCH or an RACH resource, or a new beam is selected in a corresponding candidate beam set, thereby further improving a beam failure recovery effect.

In some implementations, the BFRQ includes information about one or more new beams, and the one or more new beams include:

in a case that the terminal is configured with one candidate beam set, one or more new beams selected from the one candidate beam set; or in a case that the terminal is configured with M candidate beam sets respectively corresponding to the M BFD RS groups, one or more new beams selected from a candidate beam set corresponding to a BFD RS group in which a beam failure occurs; or in a case that the terminal is configured with K candidate beam sets, one or more new beams selected from any candidate beam set for reporting or one or more candidate beams selected from a target candidate beam set, where K is greater than M, and the K candidate beam sets include M candidate beam sets respectively corresponding to the M BFD RS groups; and the target candidate beam set is a candidate beam set corresponding to a BFD RS group except a BFD RS group in which no beam failure occurs in the K candidate beam sets.

The reporting the new beam may be reporting the new beam to the network device, to implement communication with the network device by using the new beam.

In a case that the M candidate beam sets are configured, a candidate beam included in one candidate beam set does not belong to another candidate beam set.

In this implementation, a plurality of candidate beam sets may be implemented, so that a new beam corresponding to a BFD RS group in which a beam failure occurs can be reported.

In some implementations, in a case that a beam failure occurs in N BFD RS groups, a maximum of N new beams are selected from M-N candidate beam sets, and N is less than M; or in a case that a beam failure occurs in the M BFD RS groups, a maximum of M new beams are selected or a maximum of one new beam is selected.

The selecting the maximum of N new beams from the M-N candidate beam sets may be: the terminal may select one or more new beams, but not more than N new beams. Because a maximum of M-N new beams may be selected, more new beams can be reported to further improve a beam failure recovery effect.

In some implementations, in a case that the terminal is configured with K candidate beam sets, if a plurality of new beams are selected, the selected new beams belong to different candidate beam sets.

In this implementation, a plurality of new beams may be selected from a plurality of different candidate beam sets. In this way, because the plurality of selected new beams belong to different candidate beam sets, it means that the plurality of selected new beams correspond to a plurality of TRPs. Therefore, other TRPs may be selected by using these new beams, thereby further improving a beam failure recovery effect.

In some implementations, the sending a BFRQ in a case that the beam failure event occurs includes:

sending the BFRQ in a case that there is a beam failure counter whose value is greater than or equal to a second preset threshold in M beam failure counters configured by the terminal, where the M beam failure counters respectively correspond to the M BFD RS groups; and a second preset threshold of a beam failure counter corresponding to each BFD RS group is separately configured.

In this implementation, a separate beam failure counter may be separately configured for each BFD RS group in advance, and a corresponding second preset threshold is configured. Second preset thresholds corresponding to different BFD RS groups may be the same or different. In the same case, it may be understood that the second preset threshold is common.

Because the BFRQ is sent only when a value of the beam failure counter is greater than or equal to the second preset threshold, too frequent reporting of the terminal can be avoided, thereby saving power consumption of the terminal.

In some implementations, the method further includes:

in a case that a beam failure occurs, reporting a Beam Failure Instance (BFI) to a higher layer, where the BFI includes an identifier of a BFD-RS group in which a beam failure occurs; and increasing a beam failure counter corresponding to the BFD-RS group in which a beam failure occurs by 1, where in a case that a timer corresponding to the BFD-RS group in which a beam failure occurs expires, the beam failure counter corresponding to the BFD-RS group in which a beam failure occurs is restarted, and a timer corresponding to each BFD RS group is separately configured.

In this implementation, because the BFI includes the identifier of the BFD-RS group in which a beam failure occurs, the higher layer may learn of the BFD-RS group in which a beam failure occurs, and the corresponding BFRQ is sent, to improve a beam failure recovery effect.

For example, in the MTRP scenario configuration, the network configures or indicates two BFD RS groups for the terminal. When PDCCH BLock Error Rates (BLER) of all BFD RSs in a group 1 are less than the first preset threshold, a physical layer of the terminal reports a beam failure BFI indication to a higher layer (for example, a MAC layer) of the terminal. The BFI includes a BFD-RS group number. After receiving the BFI indication, the higher layer increases a counter used for beam failure detection of the corresponding group by 1. If a value of the counter (independently set for each BFD RS group) is greater than or equal to the second preset threshold, a beam failure recovery process of the corresponding group is triggered.

In some implementations, a part of BFD RSs in the M BFD RS groups do not have a same spatial relation with a DeModulation Reference Signal (DMRS) corresponding to a CORESET; or BFD RSs in a part of BFD RS groups in the M BFD RS groups do not have a same spatial relation with a DMRS corresponding to a CORESET.

The part of BFD RSs in the M BFD RS groups may be one or more BFD RSs in the M BFD RS groups, and a specific BFD RS group is not distinguished for the one or more BFD RSs. The BFD RSs included in the part of BFD RS groups may be all or a part of BFD RSs included in one or more groups in the M BFD RS groups.

The spatial relation may be a Quasi Co-Location (QCL) relationship.

In the MTRP mode of the S-DCI, the terminal does not know a correspondence between one or more configured CORESETs and a TRP. In a case that all CORESETs are sent by one TRP, if it is specified that a BFD RS and a DMRS corresponding to a CORESET have a same spatial relation, the terminal cannot measure beam quality corresponding to another TRP. The BFD RS does not have a same spatial relation with the DMRS corresponding to the CORESET. In this way, the part of BFD RSs or the BFD RSs included in the part of BFD RS groups may correspond to a plurality of TRPs, so that the terminal can detect beam quality of CORESETs of the plurality of TRPs by using the BFD RSs, to improve a detection effect of the terminal.

In some implementations, the sending a BFRQ includes:

in a case that a beam failure occurs in a part of BFD RS groups, sending, by using the most recently scheduled uplink data channel, a MAC CE that carries the BFRQ; or in a case that a beam failure occurs in a part of BFD RS groups, sending a Scheduling Request (SR), and sending, on an uplink data channel, a MAC CE that carries the BFRQ, where the uplink data channel is an uplink data channel obtained by means of scheduling by using the SR request.

The SR may be a PUCCH-SR, or may be a PUCCH-BFR of a PCell or a SCell. Uplink scheduling is requested by using the SR, and the MAC CE that carries the BFRQ is sent on the scheduled uplink data channel.

In this implementation, because a beam failure occurs in a part of BFD RS groups, that is, there is still a part of BFD RS groups in which no beam failure occurs, that is, a part of TRPs fail, but another part of TRPs are in a relatively good connection state, the BFRQ is sent by using the MAC CE, to implement fast sending of the BFRQ, thereby improving beam failure recovery efficiency.

In some implementations, the sending an SR includes:

sending the SR by using a first PUCCH, where the first PUCCH corresponds to a BFD RS group in which a beam failure occurs or a BFD RS group in which no beam failure occurs.

The first PUCCH may be a specially configured PUCCH-BFR.

In this implementation, the SR may be sent by using the first PUCCH corresponding to the BFD RS group in which a beam failure occurs or the BFD RS group in which no beam failure occurs.

For example, if only one PUCCH-BFR is configured on one Component Carrier (CC), the PUCCH-BFR is used to send the SR; if a plurality of PUCCH-BFRs are configured on one CC and a PUCCH-BFR is associated with a BFD-RS group, the PUCCH-BFR may be selected according to a predetermined rule to send the SR. For example, according to a configuration, a PUCCH-BFR corresponding to a TRP or a BFR RS group that does not fail is used to send the SR, or any PUCCH-BFR is used to send the SR.

In some implementations, the terminal sends the BFRQ by using the MAC CE in a MTRP configuration; or in a case that the terminal obtains a configuration indication of sending the BFRQ using the MAC CE, the terminal sends the BFRQ by using the MAC CE.

The configuration indication may be configured by the network side.

In this implementation, the BFRQ may be sent by using the MAC CE according to the configuration. For example, when the terminal is configured with a plurality of different CORESETPoolIndex, or at least one TC code point corresponds to a plurality of TC states, or a dedicated configuration indication, the BFRQ is sent by using the MAC CE.

In some implementations, the uplink data channel corresponds to a TRP on which no beam failure occurs.

The TRP on which no beam failure occurs corresponding to the uplink data channel may be determined by using a CORESETPoolIndex corresponding to a CORESET in which DCI for scheduling a PUSCH is located.

In this implementation, the MAC CE that carries BFRQ information is sent by using the most recently scheduled PUSCH corresponding to the TRP that does not fail, thereby facilitating beam failure recovery.

In some implementations, the BFRQ includes:

information about a BFD RS group in which a beam failure occurs; or information about a TRP corresponding to a BFD RS group in which a beam failure occurs.

The information about the BFD RS group may be a group number.

By using the foregoing information, the network device may learn the information about the BFD RS group in which a beam failure occurs or the information about the TRP corresponding to the BFD RS group in which a beam failure occurs, thereby facilitating beam failure recovery between the network device and the terminal.

Further, the BFRQ may further include or not include information about a new beam, because the network device may determine, according to a PRACH resource of a detected BFRQ, the new beam and a BFD RS group in which a beam failure event occurs, to update a beam of a corresponding TRP, or the network device may trigger, by using a TRP in which no beam failure occurs, the terminal to re-perform a beam training process and report the information about the new beam. It should be noted that the new beam may be referred to as a new candidate beam.

In some implementations, in a case that a beam failure occurs in a part of BFD RS groups, the sending a BFRQ includes:

if a beam failure occurs in another part of BFD RS groups in a process of sending the BFRQ by using the MAC CE, interrupting sending of the MAC CE, and sending the BFRQ by using a RACH, where the BFRQ process is a process from determining that a beam failure occurs in a part of BFD RS groups to sending a Physical Uplink Shared CHannel (PUSCH) of the MAC CE that carries the BFRQ; or if a beam failure occurs in another part of BFD RS groups in a process of sending the BFRQ by using the MAC CE, continuing to send the MAC CE, and sending the BFRQ by using a RACH, where the BFRQ process is a process from determining that a beam failure occurs in a part of BFD RS groups to sending a PUSCH of the MAC CE that carries the BFRQ; or if the MAC CE and an uplink service are multiplexed for sending, continuing to send a PUSCH that multiplexes the MAC CE and the uplink service, or if only the MAC CE is sent, not sending a PUSCH that carries the MAC CE.

In this implementation, in a process in which a beam failure occurs in a part of BFD RS groups and the BFRQ is being sent, a beam failure occurs in a new BFD RS group, and the BFRQ is sent by using a RACH, or in a case that the MAC CE is multiplexed with the uplink service is multiplexed for sending, the PUSCH that multiplexes the MAC CE and the uplink service is continued to be sent, to implement fast sending of the BFRQ, thereby improving beam failure recovery efficiency.

In addition, in a process of sending the BFRQ by using the MAC CE, a beam failure occurs in another part of BFD RS groups, the MAC CE may not be sent in a case that the MAC CE has not been sent on a PUCSH. That the MAC CE has not been sent on a PUCSH may include any one of the following:

the MAC CE has not been generated;

the MAC CE has been generated but has not encapsulated into a Protocol Data Unit (PDU); and the PDU has been generated but has not been sent on the PUSCH.

In addition, in the foregoing case, the MAC PDU may be reconstructed. For example, the MAC CE in the MAC PDU is deleted and some bits are filled.

In addition, the reporting the BFRQ by using a RACH may be: if the Contention Free Random Access (CFRA) is configured and the new beam is found, sending BFRQ information by using the RACH of the CFRA; otherwise, the BFRQ information is sent by using the RACH of the Contention Based Random Access (CBRA).

In some implementations, the sending a BFRQ includes:

in a case that an SR fails or a beam failure occurs in all the M BFD RS groups, sending the BFRQ by using a RACH.

That the SR fails may be sending of the SR fails in the foregoing implementation of sending the BFRQ by using the MAC CE.

In this implementation, because the SR fails or a beam failure occurs in each of the M BFD RS groups, the BFRQ is sent by using the RACH, so that beam failure recovery can be quickly performed.

In some implementations, the sending the BFRQ by using a RACH includes:

in a case that a beam failure occurs in all the M BFD RS groups and the terminal finds a new beam, reporting the BFRQ by using a RACH of CFRA; or reporting the BFRQ using a RACH of CBRA.

For example, if the CFRA is configured and the new beam is found, the BFRQ information is sent by using the RACH of the CFRA. Otherwise, the BFRQ information is sent by using the RACH of the CBRA.

It should be noted that if the network side receives the BFRQ of the CFRA or the CBRA, it may be determined that a beam failure occurs in each of the M BFD RS groups of the terminal.

In some implementations, a RACH resource of the RACH corresponds to at least one of the following:

a new beam, and a BFD RS group in which a beam failure occurs.

In this implementation, the PRACH resource for sending the BFRQ may be determined according to at least one of the BFD RS group in which a beam failure occurs and the detected new beam, for example, a preamble and a PRACH time-frequency resource are determined, for example, a PRACH occasion. Further, the BFD RS group in which a beam failure occurs and the detected new beam may be indicated to the network device by using the foregoing RACH resource.

In some implementations, after the sending a BFRQ, the method further includes:

after a beam failure occurs in a part of BFD RS groups and the BFRQ is sent, monitoring a Beam Failure Recovery Response (BFRR) of the BFRQ; or after the BFRQ is sent, not monitoring a response of the BFRQ, and in a case that the BFRQ is successfully sent, determining that a beam failure recovery BFR succeeds.

The monitoring a response may be that if the MAC CE is sent, the terminal continues to monitor to responses of all CORESETs, and the network side may send the responses by using a CORESET corresponding to a new TCI.

In this implementation, after the BFRQ is sent, the response of the BFRQ is not monitored, that is, the BFR is not monitored. For example, a MAC behavior of the terminal may be: Once the MAC CE is sent, it is considered that the BFR succeeds, the BFR triggered by the corresponding BFD RS group is canceled, the corresponding beam failure counter (for example, a BFR counter) is set to 0, and the corresponding timer (for example, a BFR timer) is restarted.

Further, in a case that the response of the BFRQ is not monitored, a beam may be reconfigured by the network side by using a connected TRP, for example, a TCI state, a spatial relation state, or the like is reconfigured.

In some implementations, the method further includes:

in a case that a network side reconfigures a CORESET-PoolIndex corresponding to a BFD RS, resetting at least one of a beam failure counter and a beam failure timer corresponding to a BFD RS group to which the reconfigured BFD RS belongs.

The resetting a beam failure counter may be resetting the beam failure counter to 0, and the resetting a beam failure timer may be restarting the beam failure timer, cancel the triggered beam failure event.

For example, if an initial configuration is that a BFD-RS 1 corresponds to a CORESETPoolIndex 0, and a BFD-RS 2 corresponds to a CORESETPoolIndex 1, in a BFD/BFR process, if reconfiguration of the network side is received, and both the BFD-RS 1 and the BFD-RS2 are configured to be corresponding to the CORESETPoolIndex 0, at least one of the corresponding beam failure counter and the beam failure timer is reset.

In some implementations, the method further includes:

after a beam failure occurs in a part of BFD RS groups and the BFRQ is sent, determining that a BFRR is received in any one of the following conditions:

a preset PUSCH scheduled by a PDCCH is received; or a preset PDCCH is received; or target MAC CE activation signaling is received, where the target MAC CE activation signaling is used to activate a transmission configuration indication TCI state of a CORESET, and the TCI state corresponds to a new beam; or target higher layer signaling is received, where the target higher layer signaling includes setting a TCI state of a CORESET, and the TCI state corresponds to a new beam.

The preset PUSCH may be a PUSCH that is scheduled by the PDCCH and that has a same HARQ process number as the first PUSCH and whose New Data Indicator (NDI) is not reversed.

The preset PDCCH may be a PDCCH detected on a search space set configured with a recovery Search Space Identifier (recoverySearchSpaceId) according to the QCL of the reported new beam in a window starting from a slot n+4 after a PRACH is sent on a slot n. The PDCCH is scrambled by a Cell Radio Network Temporary Identifier (C-RNTI) or a Modulation and Coding Scheme Radio Network Temporary Identifier (MCS-RNTI).

The target MAC CE activation signaling may activate the TCI state of the CORESET, and the activated TCI state includes the new beam.

In addition, that a preset PUSCH scheduled by a PDCCH is received may be: the preset PUSCH scheduled by the PDCCH is received on a CORESET that uses a reported new beam. Certainly, this is not limited. The CORESET of the new beam may be configured to be associated with a CORESET for receiving beam failure recovery. In addition, the CORESET may be a CORESET configured to receive the BFRR, for example, a CORESET-BFR, that is, a search space set associated with the CORESET is configured as a recovery search space identifier.

Further, when a BFRR is not received in a preset window after the terminal reports the BFRQ including information about a new beam, the beam is not reset. If receiving and sending are still performed by using an original beam, for example, the response is not sent when the network side finds that one TRP remains connected, the network device may trigger, by using a TRP in which no beam failure occurs, the terminal to re-perform a beam training process, and report the information about the new beam. If the BFRR is received in the preset window, the beam is reset.

In some implementations, if the terminal is in an MTRP state of M-DCI, the method further includes:

after a beam failure occurs in a part of BFD RS groups, the BFRQ is sent, and a preset PUSCH scheduled by a PDCCH is received or a preset PDCCH is received, and before MAC CE activation signaling of a TCI state is received, assuming that an antenna port of a CORESET associated with a CORESETPoolIndex corresponding to a BFD RS group in which a beam failure occurs has a QCL relationship with a new beam, and assuming that an antenna port for receiving a PDSCH has a QCL relationship with the new beam; or after a beam failure occurs in a part of BFD RS groups, the BFRQ is sent, and target MAC CE activation signaling is received, and before MAC CE activation signaling of a TCI state is received, determining, according to the target MAC CE activation signaling indication, a TCI state of a CORESET associated with a CORESETPoolIndex corresponding to a BFD RS group in which a beam failure occurs, where the target MAC CE activation signaling is used to activate the TCI state of the CORESET, and the TCI state corresponds to a new beam: or after a beam failure occurs in a part of BFD RS groups, the BFRQ is sent, and target higher layer signaling is received, and before MAC CE activation signaling of a transmission configuration indication TCI state is received, determining, according to a parameter configuration of the target higher layer signaling, a TCI state of a CORESET associated with a CORESETPoolIndex corresponding to a BFD RS group in which a beam failure occurs, where the target higher layer signaling includes setting the TCI state of the CORESET, and the TCI state corresponds to a new beam; or after a beam failure occurs in all the M BFD RS groups, the BFRQ is sent to report a new beam, and a preset PDCCH is received, and before MAC CE activation signaling of a TCI state is received, reserving, by the terminal, only a part of CORESETs, and assuming that an antenna port of the part of CORESETs has a QCL relationship with the new beam; or after a beam failure occurs in a part of BFD RS groups and the BFRQ is sent, and before MAC CE activation signaling of a TCI state is received, assuming that an antenna port of a CORESET associated with a CORESETPoolIndex corresponding to a BFD RS group in which a beam failure occurs has a QCL relationship with a new beam, and assuming that an antenna port for receiving a PDSCH has a QCL relationship with the new beam.

It should be noted that, in this embodiment of this application, assuming may also be understood as determining. For example, it may be understood that the assuming that an antenna port of a CORESET associated with a CORESETPoolIndex corresponding to a BFD RS group in which a beam failure occurs has a QCL relationship with a new beam, and assuming that an antenna port for receiving a PDSCH has a QCL relationship with the new beam is determining that the antenna port of the CORESET associated with the CORESETPoolIndex corresponding to the BFD RS group in which a beam failure occurs has the QCL relationship with the new beam, and determining that the antenna port for receiving the PDSCH has the QCL relationship with the new beam.

The MAC CE activation signaling of the TCI state may be MAC CE activation signaling used for beam training or beam update. The MAC CE activation signaling and MAC CE activation signaling of the new beam or a new TCI state may be activation commands of a same type or different types.

The reserving a part of CORESETs may be reserving a pre-selected part of CORESET. For example, this part of CORESET may be preconfigured by the network side, agreed upon in a protocol, or determined by the terminal.

In some implementations, only CORESETs corresponding to a specified CORESETPoolIndex, such as those CORESETs corresponding to CORESETPoolIndex 0, may be reserved.

If the MAC CE activation signaling does not include a TCI state of a CORESET associated with a CORESETPoolIndex corresponding to a BFD RS group in which no beam failure occurs, the TCI state of the CORESET associated with the CORESETPoolIndex corresponding to the BFD RS group in which no beam failure occurs is not affected.

In some implementations, if the terminal is in a MTRP state of S-DCI, the method further includes:

after a beam failure occurs in a part of BFD RS groups, the BFRQ is sent, and a preset PUSCH scheduled by a PDCCH is received or a preset PDCCH is received, and before MAC CE activation signaling of a TCI state is received, assuming that an antenna port or a CORESET-BFR of a CORESET corresponding to a BFD RS group in which a beam failure occurs has a QCL relationship with a new beam; or after a beam failure occurs in a part of BFD RS groups, the BFRQ is sent, and target MAC CE activation signaling is received, and before MAC CE activation signaling of a TCI state is received, receiving a PDCCH according to an indication of the target MAC CE activation signaling, where the target MAC CE activation signaling is used to activate a TCI state of a CORESET, and the TCI state corresponds to a new beam; or after a beam failure occurs in a part of BFD RS groups and the BFRQ is sent, and before MAC CE activation signaling of a TCI state is received, assuming that an antenna port or a CORESET-BFR of a CORESET corresponding to a BFD RS group in which a beam failure occurs has a QCL relationship with a new beam.

Further, the QCL of the antenna port of the CORESET corresponding to the BFD RS group in which no beam failure occurs remains unchanged.

In some implementations, when a BFRR is not received in a preset window after the terminal reports the BFRQ including information about a new beam, a PDCCH is stilled received by using an original TCI state or an original beam; or before the terminal reports the BFRQ including information about a new beam and receives MAC CE activation signaling of a TCI state, a PDCCH is stilled received by using an original TCI state or an original beam.

For example, after a beam failure occurs in all BFD RS groups, the BFRQ is sent, and the BFRR is received, and before the MAC CE activation signaling of the TC state is received, the terminal performs PDCCH detection and PDSCH reception according to an existing QCL hypothesis.

In this implementation, the BFRR may not be monitored, and the PDCCH is still received by directly using the original TCI state or the original beam before the MAC CE activation signaling of the TCI state is received.

In this embodiment of this application, a beam failure event is triggered in a first condition, and a BFRQ is reported according to the beam failure event. The first condition includes: a beam failure occurs on each BFD RS in any BFD RS group in the M BFD RS groups; or a beam failure occurs on any BFD RS in the M BFD RS groups; or a beam failure occurs on all BFD RSs in each BFD RS group in the M BFD RS groups, where the M BFD RS groups are obtained by classifying a plurality of BFD RSs corresponding to the terminal, M is a positive integer greater than 1, and that a beam failure occurs on an BFD RS means that a quality detection result of the BFD RS is lower than a corresponding first preset threshold. In this way, beam failure recovery can be performed in a plurality of BFD RS scenarios, thereby improving a beam failure recovery effect of a terminal.

Figure 3:
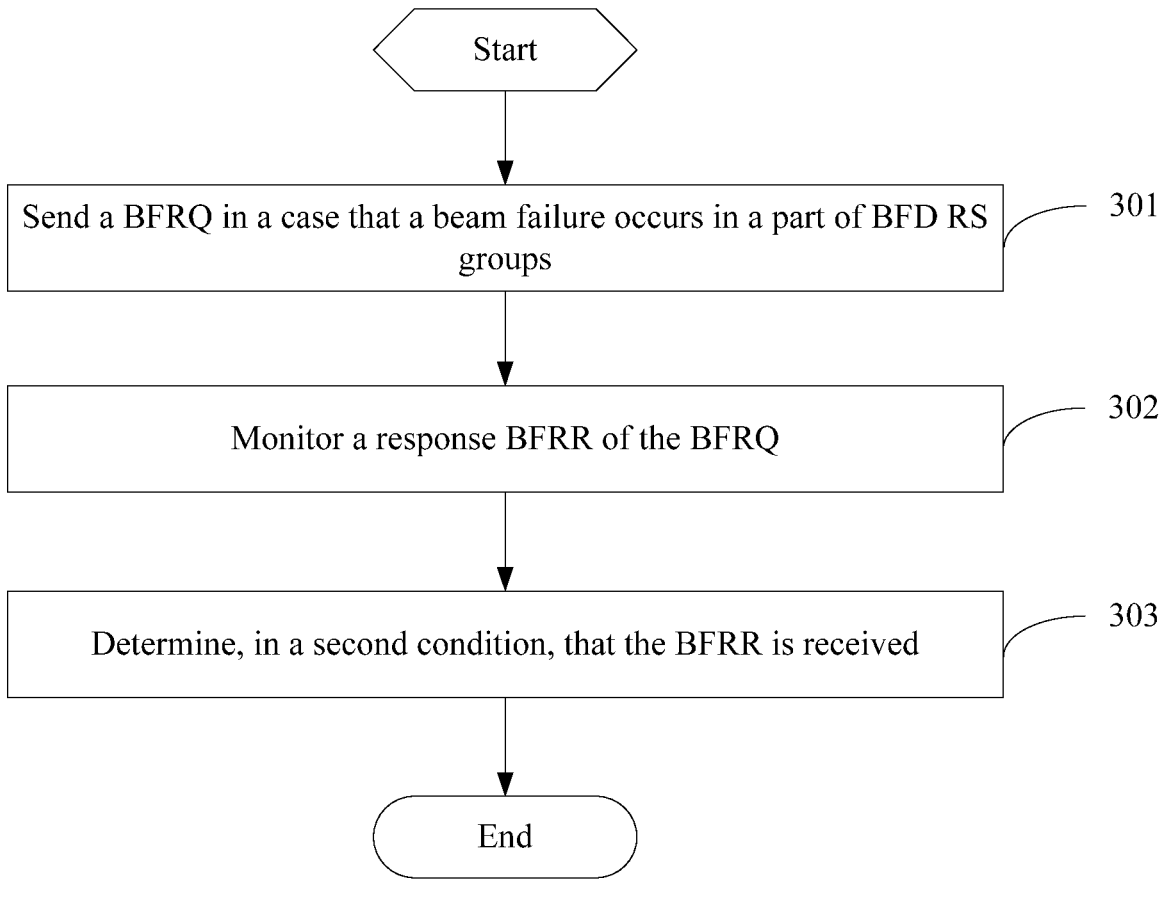
FIG. 3 is a flowchart of another beam failure recovery method according to an embodiment of this application.

Referring to FIG. 3, FIG. 3 is a flowchart of another beam failure recovery method according to an embodiment of the present invention. As shown in FIG. 3, the method includes the following steps.

Step 301: Send a BFRQ in a case that a beam failure occurs in a part of BFD RS groups.

For the part of BFD RS groups, refer to the part of BFD RS groups in the plurality of BFD RS groups in the embodiment shown in FIG. 2.

Step 302: Monitor a response BFRR of the BFRQ.

Step 303: Determine, in a second condition, that the BFRR is received.

In some implementations, the second condition includes:

a preset PUSCH scheduled by a PDCCH is received; or a preset PDCCH is received; or target MAC CE activation signaling is received, where the target MAC CE activation signaling is used to activate a TCI state of a CORESET, and the TCI state corresponds to a new beam; or target higher layer signaling is received, where the target higher layer signaling includes setting a TCI state of a CORESET, and the TCI state corresponds to a new beam.

It should be noted that for a specific implementation in which it is determined that the BFRR is received in this embodiment, refer to the corresponding descriptions shown in FIG. 2. Details are not described herein again.

In this embodiment, through the foregoing steps, beam failure recovery can be performed in a plurality of BFD RS scenarios, thereby improving a beam failure recovery effect of a terminal.

Figure 4:
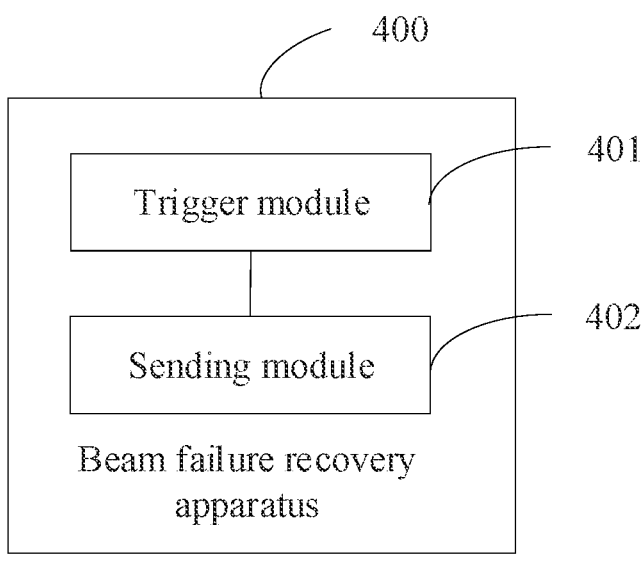
FIG. 4 is a structural diagram of a beam failure recovery apparatus according to an embodiment of this application.

Referring to FIG. 4, FIG. 4 is a structural diagram of a beam failure recovery apparatus according to an embodiment of this application. As shown in FIG. 4, a beam failure recovery apparatus 400 includes:

a trigger module 401, configured to trigger a beam failure event in a first condition; and a sending module 402, configured to send a beam failure recovery request BFRQ in a case that the beam failure event occurs, where the first condition and/or the BFRQ are/is related to M BFD RS groups, and M is a positive integer greater than 1.

In some implementations, the first condition includes:

a beam failure occurs on each BFD RS in any BFD RS group in the M BFD RS groups; or a beam failure occurs on any BFD RS in the M BFD RS groups; or a beam failure occurs on all BFD RSs in each BFD RS group in the M BFD RS groups, where the M BFD RS groups are obtained by classifying a plurality of BFD RSs corresponding to a terminal, and that a beam failure occurs on an BFD RS means that a quality detection result of the BFD RS is lower than a corresponding first preset threshold.

In some implementations, the M BFD RS groups respectively correspond to M first preset thresholds.

In some implementations, the first condition is configured by a network side.

In some implementations, each BFD RS group corresponds to one or more of the following configurations:

a first Physical Uplink Control CHannel (PUCCH), a Random Access CHannel (RACH) resource, and a candidate beam set.

In some implementations, the BFRQ includes information about one or more new beams, and the one or more new beams include:

in a case that the terminal is configured with one candidate beam set, one or more new beams selected from the one candidate beam set; or in a case that the terminal is configured with M candidate beam sets respectively corresponding to the M BFD RS groups, one or more new beams selected from a candidate beam set corresponding to a BFD RS group in which a beam failure occurs; or in a case that the terminal is configured with K candidate beam sets, one or more new beams selected from any candidate beam set or one or more candidate beams selected from a target candidate beam set, where K is greater than M, and the K candidate beam sets include M candidate beam sets respectively corresponding to the M BFD RS groups; and the target candidate beam set is a candidate beam set corresponding to a BFD RS group except a BFD RS group in which no beam failure occurs in the K candidate beam sets.

In some implementations, in a case that a beam failure occurs in N BFD RS groups, a maximum of N new beams is selected from M-N candidate beam sets, and N is less than M; or in a case that a beam failure occurs in the M BFD RS groups, a maximum of M new beams are selected or a maximum of one new beam is selected.

In some implementations, in a case that the terminal is configured with K candidate beam sets, if a plurality of new beams are selected, the selected new beams belong to different candidate beam sets.

In some implementations, based on the beam failure event, the sending module 402 is configured to:

send the BFRQ in a case that there is a beam failure counter whose value is greater than or equal to a second preset threshold in M beam failure counters configured by the terminal, where the M beam failure counters respectively correspond to the M BFD RS groups; and a second preset threshold of a beam failure counter corresponding to each BFD RS group is separately configured.

In some implementations, the apparatus further includes:

a reporting module, configured to: in a case that a beam failure occurs, report a Beam Failure Instance (BFI) to a higher layer, where the BFI includes an identifier of a BFD-RS group in which a beam failure occurs; and a counting module, configured to increase a beam failure counter corresponding to the BFD-RS group in which a beam failure occurs by 1, where in a case that a timer corresponding to the BFD-RS group in which a beam failure occurs expires, the beam failure counter corresponding to the BFD-RS group in which a beam failure occurs is restarted, and a timer corresponding to each BFD RS group is separately configured.

In some implementations, a part of BFD RSs in the M BFD RS groups do not have a same spatial relation with a demodulation reference signal DMRS corresponding to a control resource set CORESET; or BFD RSs in a part of BFD RS groups in the M BFD RS groups do not have a same spatial relation with a DMRS corresponding to a control resource set CORESET.

In some implementations, the sending module 402 is configured to:

in a case that a beam failure occurs in a part of BFD RS groups, send, by using the most recently scheduled uplink data channel, an MAC CE that carries the BFRQ; or in a case that a beam failure occurs in a part of BFD RS groups, send a scheduling request SR, and send, on an uplink data channel, a MAC CE that carries the BFRQ, where the uplink data channel is an uplink data channel obtained by means of scheduling by using the SR request.

In some implementations, the sending an SR includes:

send the SR by using a first PUCCH, where the first PUCCH corresponds to a BFD RS group in which a beam failure occurs or a BFD RS group in which no beam failure occurs.

In some implementations, the terminal sends the BFRQ by using the MAC CE in a MTRP configuration; or in a case that the terminal obtains a configuration indication of sending the BFRQ using the MAC CE, the terminal sends the BFRQ by using the MAC CE.

In some implementations, the uplink data channel corresponds to a TRP on which no beam failure occurs.

In some implementations, the BFRQ includes:

information about a BFD RS group in which a beam failure occurs; or information about a TRP corresponding to a BFD RS group in which a beam failure occurs.

In some implementations, in a case that a beam failure occurs in a part of BFD RS groups, the sending module 402 is further configured to:

if a beam failure occurs in another part of BFD RS groups in a process of sending the BFRQ by using the MAC CE, interrupt sending of the MAC CE, and send the BFRQ by using a RACH, where the BFRQ process is a process from determining that a beam failure occurs in a part of BFD RS groups to sending a Physical Uplink Shared CHannel (PUSCH) of the MAC CE that carries the BFRQ; or if a beam failure occurs in another part of BFD RS groups in a process of sending the BFRQ by using the MAC CE, continue to send the MAC CE, and send the BFRQ by using a RACH, where the BFRQ process is a process from determining that a beam failure occurs in a part of BFD RS groups to sending a PUSCH of the MAC CE that carries the BFRQ; or if the MAC CE and an uplink service are multiplexed for sending, continue to send a PUSCH that multiplexes the MAC CE and the uplink service, or if only the MAC CE is sent, not send a PUSCH that carries the MAC CE.

In some implementations, the sending module 402 is configured to:

in a case that an SR fails or a beam failure occurs in all the M BFD RS groups, report the BFRQ by using an RACH.

In some implementations, the sending the BFRQ by using a RACH includes:

in a case that a beam failure occurs in all the M BFD RS groups and the terminal finds a new beam, reporting the BFRQ by using a RACH of Contention Free Random Access (CFRA); or reporting the BFRQ by using a RACH of Contention Based Random Access (CBRA).

In some implementations, a RACH resource of the RACH corresponds to at least one of the following:

a new beam, and a BFD RS group in which a beam failure occurs.

In some implementations, the apparatus further includes:

a monitoring module, configured to: after a beam failure occurs in a part of BFD RS groups and the BFRQ is sent, monitor a BFRR of the BFRQ; or a first determining module, configured to: after the BFRQ is sent, not monitor a response of the BFRQ, and in a case that the BFRQ is successfully sent, determine that BFR succeeds.

In some implementations, the apparatus further includes:
a first resetting module, configured to: in a case that a network side reconfigures a CORESET Pool Index (CORESETPoolIndex) corresponding to a BFD RS, reset at least one of a beam failure counter and a beam failure timer corresponding to a BFD RS group to which the reconfigured BFD RS belongs.

In some implementations, the apparatus further includes:
a second determining module, configured to: after a beam failure occurs in a part of BFD RS groups and the BFRQ is sent, determine that a BFRR is received in any one of the following conditions:

a preset PUSCH scheduled by a PDCCH is received; or
a preset PUSCH scheduled by a PDCCH is received; or
a preset PDCCH is received; or
target MAC CE activation signaling is received, where the target MAC CE activation signaling is used to activate a TCI state of a CORESET, and the TCI state corresponds to a new beam; or
target higher layer signaling is received, where the target higher layer signaling includes setting a TCI state of a CORESET, and the TCI state corresponds to a new beam.

In some implementations, if the terminal is in an MTRP state of M-DCI, the apparatus further includes:
a first assuming module, configured to: after a beam failure occurs in a part of BFD RS groups, the BFRQ is sent, and a preset PUSCH scheduled by a PDCCH is received or a preset PDCCH is received, and before MAC CE activation signaling of a TCI state is received, assume that an antenna port of a CORESET associated with a CORESETPoolIndex corresponding to a BFD RS group in which a beam failure occurs has a QCL relationship with a new beam, and assume that an antenna port for receiving a PDSCH has a QCL relationship with the new beam; or
a second assuming module, configured to: after a beam failure occurs in a part of BFD RS groups, the BFRQ is sent, and target MAC CE activation signaling is received, and before MAC CE activation signaling of a transmission configuration indication TCI state is received, determine, according to the target MAC CE activation signaling indication, a TCI state of a CORE-SET associated with a CORESETPoolIndex corresponding to a BFD RS group in which a beam failure occurs, where the target MAC CE activation signaling is used to activate the TCI state of the CORESET, and the TCI state corresponds to a new beam; or
a third assuming module, configured to: after a beam failure occurs in a part of BFD RS groups, the BFRQ is sent, and target higher layer signaling is received, and before MAC CE activation signaling of a TCI state is received, determine, according to a parameter configuration of the target higher layer signaling, a TCI state of a CORESET associated with a CORESETPoolIndex corresponding to a BFD RS group in which a beam failure occurs, where the target higher layer signaling includes setting the TCI state of the CORESET, and the TCI state corresponds to a new beam; or
a fourth assuming module, configured to: after a beam failure occurs in all the M BFD RS groups, the BFRQ is sent to report a new beam, and a preset PDCCH is received, and before MAC CE activation signaling of a transmission configuration indication TCI state is received, reserve only a part of CORESETs, and assume that an antenna port of the part of CORESETs has a QCL relationship with the new beam; or
a fifth assuming module, configured to: after a beam failure occurs in a part of BFD RS groups and the BFRQ is sent, and before MAC CE activation signaling of a TCI state is received, assume that an antenna port of a CORESET associated with a CORESETPoolIndex corresponding to a BFD RS group in which a beam failure occurs has a QCL relationship with a new beam, and assume that an antenna port for receiving a PDSCH has a QCL relationship with the new beam.

In some implementations, if the terminal is in a MTRP state of S-DCI, the apparatus further includes:
a fifth assuming module, configured to: after a beam failure occurs in a part of BFD RS groups, the BFRQ is sent, and a preset PUSCH scheduled by a PDCCH is received or a preset PDCCH is received, and before MAC CE activation signaling of a TCI state is received, assume that an antenna port or a CORESET-BFR of a CORESET corresponding to a BFD RS group in which a beam failure occurs has a QCL relationship with a new beam; or
a receiving module, configured to: after a beam failure occurs in a part of BFD RS groups, the BFRQ is sent, and target MAC CE activation signaling is received, and before MAC CE activation signaling of a TCI state is received, receive a PDCCH according to an indication of the target MAC CE activation signaling, where the target MAC CE activation signaling is used to activate a TCI state of a CORESET, and the TCI state corresponds to a new beam; or
a sixth assuming module, configured to: after a beam failure occurs in a part of BFD RS groups and the BFRQ is sent, and before MAC CE activation signaling of a TCI state is received, assume that an antenna port or a CORESET-BFR of a CORESET corresponding to a BFD RS group in which a beam failure occurs has a QCL relationship with a new beam.

In some implementations, when a BFRR is not received in a preset window after the terminal reports the BFRQ including information about a new beam, a PDCCH is stilled received by using an original TCI state or an original beam; or before the terminal reports the BFRQ including information about a new beam and receives MAC CE activation signaling of a TCI state, a PDCCH is stilled received by using an original TC state or an original beam.

The beam failure recovery apparatus provided in this embodiment of this application can implement the processes in the method embodiment of FIG. 2. To avoid repetition, details are not described herein again. In addition, a beam failure recovery effect of a terminal can be improved.

It should be noted that the beam failure recovery apparatus in this embodiment of this application may be an apparatus, or may be a component, an integrated circuit, or a chip in a terminal.

Figure 5:
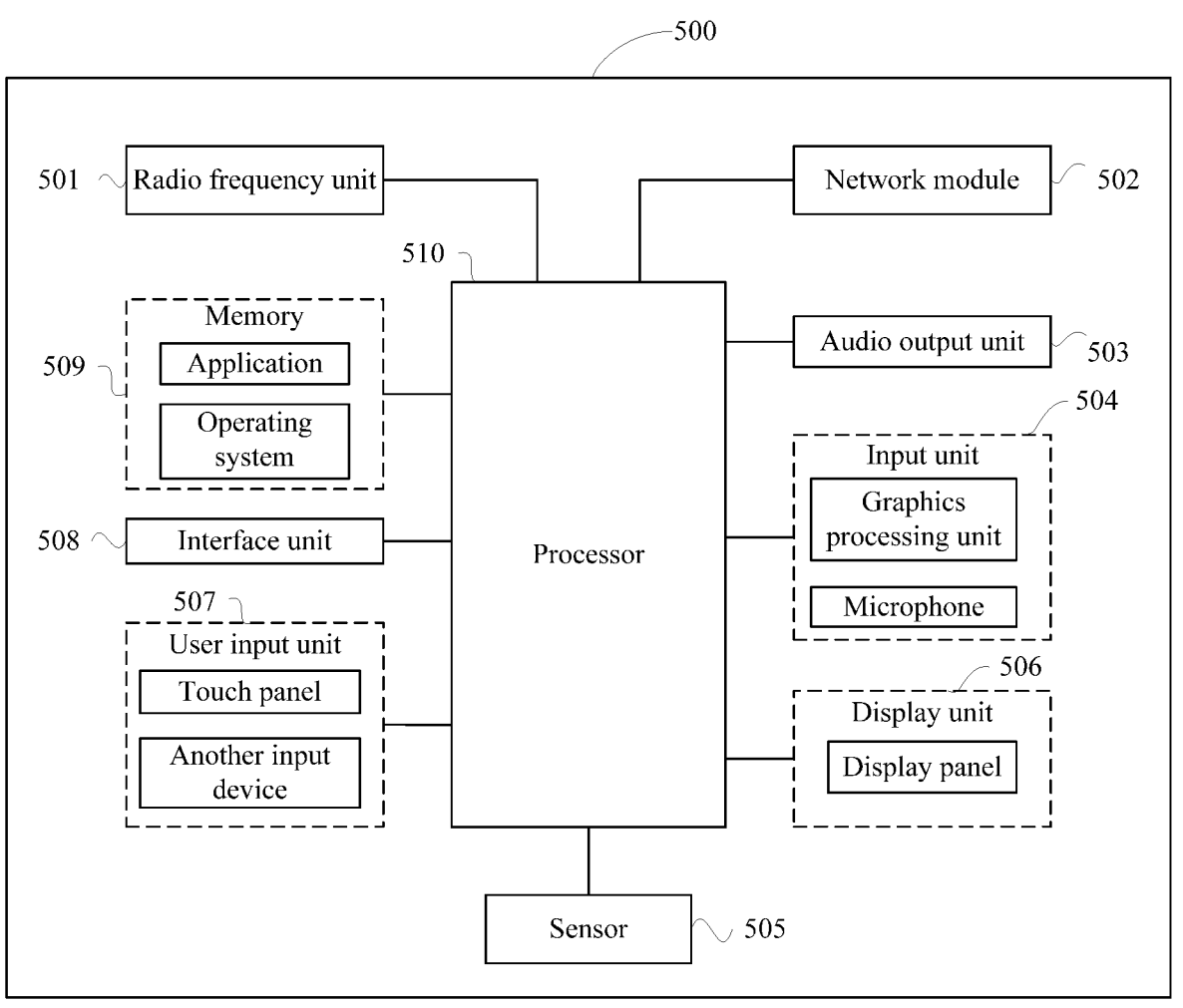
FIG. 5 is a structural diagram of a terminal according to an embodiment of this application.

FIG. 5 is a schematic structural diagram of hardware of a terminal according to an embodiment of this application.

A terminal 500 includes but is not limited to components such as a radio frequency unit 501, a network module 502, an audio output unit 503, an input unit 504, a sensor 505, a display unit 506, a user input unit 507, an interface unit 508, a memory 508, and a processor 510.

A person skilled in the art can understand that the communications device 500 may further include a power supply (for example, a battery) that supplies power to each component. The power supply may be logically connected to the processor 510 by using a power supply management system, to implement functions such as charging and discharging management, and power consumption management by using the power supply management system. The structure of the electronic device shown in FIG. 5 does not constitute a limitation on the electronic device. The electronic device may include components more or fewer than those shown in the diagram, a combination of some components, or different component arrangements. Details are not described herein.

The processor 510 is configured to trigger a beam failure event in a first condition; and the radio frequency unit 501 is configured to send a beam failure recovery request BFRQ in a case that the beam failure event occurs, where the first condition and/or the BFRQ are/is related to M BFD RS groups, and M is a positive integer greater than 1.

In some implementations, the first condition includes:

a beam failure occurs on each BFD RS in any BFD RS group in the M BFD RS groups; or a beam failure occurs on any BFD RS in the M BFD RS groups; or a beam failure occurs on all BFD RSs in each BFD RS group in the M BFD RS groups, where the M BFD RS groups are obtained by classifying a plurality of BFD RSs corresponding to the terminal, and that a beam failure occurs on an BFD RS means that a quality detection result of the BFD RS is lower than a corresponding first preset threshold.

In some implementations, the M BFD RS groups respectively correspond to M first preset thresholds.

In some implementations, the first condition is configured by a network side.

In some implementations, each BFD RS group corresponds to one or more of the following configurations:

a first PUCCH, a RACH resource, and a candidate beam set.

In some implementations, the BFRQ includes information about one or more new beams, and the one or more new beams include:

in a case that the terminal is configured with one candidate beam set, one or more new beams selected from the one candidate beam set; or in a case that the terminal is configured with M candidate beam sets respectively corresponding to the M BFD RS groups, one or more new beams selected from a candidate beam set corresponding to a BFD RS group in which a beam failure occurs; or in a case that the terminal is configured with K candidate beam sets, one or more new beams selected from any candidate beam set or one or more candidate beams selected from a target candidate beam set, where K is greater than M, and the K candidate beam sets include M candidate beam sets respectively corresponding to the M BFD RS groups; and the target candidate beam set is a candidate beam set corresponding to a BFD RS group except a BFD RS group in which no beam failure occurs in the K candidate beam sets.

In some implementations, in a case that a beam failure occurs in N BFD RS groups, a maximum of N new beams are selected from M-N candidate beam sets, and N is less than M; or in a case that a beam failure occurs in the M BFD RS groups, a maximum of M new beams are selected or a maximum of one new beam is selected.

In some implementations, in a case that the terminal is configured with K candidate beam sets, if a plurality of new beams are selected, the selected new beams belong to different candidate beam sets.

In some implementations, the sending a BFRQ in a case that the beam failure event occurs includes:

sending the BFRQ in a case that there is a beam failure counter whose value is greater than or equal to a second preset threshold in M beam failure counters configured by the terminal, where the M beam failure counters respectively correspond to the M BFD RS groups; and a second preset threshold of a beam failure counter corresponding to each BFD RS group is separately configured.

In some implementations, the processor 510 is further configured to:

in a case that a beam failure occurs, report a BFI to a higher layer, where the BFI includes an identifier of a BFD-RS group in which a beam failure occurs; and increase a beam failure counter corresponding to the BFD-RS group in which a beam failure occurs by 1, where in a case that a timer corresponding to the BFD-RS group in which a beam failure occurs expires, the beam failure counter corresponding to the BFD-RS group in which a beam failure occurs is restarted, and a timer corresponding to each BFD RS group is separately configured.

In some implementations, a part of BFD RSs in the M BFD RS groups do not have a same spatial relation with a DMRS corresponding to a CORESET; or BFD RSs in a part of BFD RS groups in the M BFD RS groups do not have a same spatial relation with a DMRS corresponding to a CORESET.

In some implementations, the sending a BFRQ includes:

in a case that a beam failure occurs in a part of BFD RS groups, sending, by using the most recently scheduled uplink data channel, a MAC CE that carries the BFRQ; or in a case that a beam failure occurs in a part of BFD RS groups, sending a Scheduling Request (SR), and sending, on an uplink data channel, a MAC CE that carries the BFRQ, where the uplink data channel is an uplink data channel obtained by means of scheduling by using the SR request.

In some implementations, the sending an SR includes:

sending the SR by using a first PUCCH, where the first PUCCH corresponds to a BFD RS group in which a beam failure occurs or a BFD RS group in which no beam failure occurs.

In some implementations, the terminal sends the BFRQ by using the MAC CE in a MTRP configuration; or in a case that the terminal obtains a configuration indication of sending the BFRQ using the MAC CE, the terminal sends the BFRQ by using the MAC CE.

In some implementations, the uplink data channel corresponds to a TRP on which no beam failure occurs.

In some implementations, the BFRQ includes:

information about a BFD RS group in which a beam failure occurs; or information about a TRP corresponding to a BFD RS group in which a beam failure occurs.

In some implementations, in a case that a beam failure occurs in a part of BFD RS groups, the sending a BFRQ includes:

if a beam failure occurs in another part of BFD RS groups in a process of sending the BFRQ by using the MAC CE, interrupting sending of the MAC CE, and sending the BFRQ by using a RACH, where the BFRQ process is a process from determining that a beam failure occurs in a part of BFD RS groups to sending a PUSCH of the MAC CE that carries the BFRQ; or if a beam failure occurs in another part of BFD RS groups in a process of sending the BFRQ by using the MAC CE, continuing to send the MAC CE, and sending the BFRQ by using a RACH, where the BFRQ process is a process from determining that a beam failure occurs in a part of BFD RS groups to sending a PUSCH of the MAC CE that carries the BFRQ; or if the MAC CE and an uplink service are multiplexed for sending, continuing to send a PUSCH that multiplexes the MAC CE and the uplink service, or if only the MAC CE is sent, not sending a PUSCH that carries the MAC CE.

In some implementations, the sending a BFRQ includes:

in a case that an SR fails or a beam failure occurs in all the M BFD RS groups, reporting the BFRQ by using a RACH.

In some implementations, the sending the BFRQ by using a RACH includes:

in a case that a beam failure occurs in all the M BFD RS groups and the terminal finds a new beam, reporting the BFRQ by using a RACH of CFRA; or reporting the BFRQ by using a RACH of CBRA.

In some implementations, a RACH resource of the RACH corresponds to at least one of the following:

a new beam, and a BFD RS group in which a beam failure occurs.

In some implementations, after the sending a BFRQ, the radio frequency unit 501 is further configured to:

after a beam failure occurs in a part of BFD RS groups and the BFRQ is sent, monitoring a BFRR of the BFRQ.

In some implementations, after the sending a BFRQ, the processor 510 is further configured to:

after the BFRQ is sent, not monitor a response of the BFRQ, and in a case that the BFRQ is successfully sent, determine that BFR succeeds.

In some implementations, the processor 510 is further configured to:

in a case that a network side reconfigures a CORESET pool index CORESETPoolIndex corresponding to a BFD RS, reset at least one of a beam failure counter and a beam failure timer corresponding to a BFD RS group to which the reconfigured BFD RS belongs.

In some implementations, the processor 510 is further configured to:

after a beam failure occurs in a part of BFD RS groups and the BFRQ is sent, determine that a BFRR is received in any one of the following conditions:

a preset PUSCH scheduled by a PDCCH is received; or a preset PDCCH is received; or target MAC CE activation signaling is received, where the target MAC CE activation signaling is used to activate a TCI state of a CORESET, and the TCI state corresponds to a new beam; or target higher layer signaling is received, where the target higher layer signaling includes setting a TCI state of a CORESET, and the TCI state corresponds to a new beam.

In some implementations, if the terminal is in a MTRP state of M-DCI, the processor 510 is further configured to:

after a beam failure occurs in a part of BFD RS groups, the BFRQ is sent, and a preset PUSCH scheduled by a PDCCH is received or a preset PDCCH is received, and before MAC CE activation signaling of a TCI state is received, assume that an antenna port of a CORESET associated with a CORESETPoolIndex corresponding to a BFD RS group in which a beam failure occurs has a QCL relationship with a new beam, and assume that an antenna port for receiving a PDSCH has a QCL relationship with the new beam; or after a beam failure occurs in a part of BFD RS groups, the BFRQ is sent, and target MAC CE activation signaling is received, and before MAC CE activation signaling of a TCI state is received, determine, according to the target MAC CE activation signaling indication, a TCI state of a CORESET associated with a CORESETPoolIndex corresponding to a BFD RS group in which a beam failure occurs, where the target MAC CE activation signaling is used to activate the TCI state of the CORESET, and the TCI state corresponds to a new beam; or after a beam failure occurs in a part of BFD RS groups, the BFRQ is sent, and target higher layer signaling is received, and before MAC CE activation signaling of a TCI state is received, determine, according to a parameter configuration of the target higher layer signaling, a TCI state of a CORESET associated with a CORESET-PoolIndex corresponding to a BFD RS group in which a beam failure occurs, where the target higher layer signaling includes setting the TCI state of the CORE-SET, and the TCI state corresponds to a new beam; or after a beam failure occurs in all the M BFD RS groups, the BFRQ is sent to report a new beam, and a preset PDCCH is received, and before MAC CE activation signaling of a transmission configuration indication TCI state is received, reserve only a part of CORE-SETs, and assume that an antenna port of the part of CORESETs has a QCL relationship with the new beam; or after a beam failure occurs in a part of BFD RS groups and the BFRQ is sent, and before MAC CE activation signaling of a TCI state is received, assume that an antenna port of a CORESET associated with a CORE-SETPoolIndex corresponding to a BFD RS group in which a beam failure occurs has a QCL relationship with a new beam, and assume that an antenna port for receiving a PDSCH has a QCL relationship with the new beam.

In some implementations, if the terminal is in a MTRP state of S-DCI, the processor 510 is further configured to:

after a beam failure occurs in a part of BFD RS groups, the BFRQ is sent, and a preset PUSCH scheduled by a PDCCH is received or a preset PDCCH is received, and before MAC CE activation signaling of a TCI state is received, assume that an antenna port or a CORESET-BFR of a CORESET corresponding to a BFD RS group in which a beam failure occurs has a QCL relationship with a new beam, or after a beam failure occurs in a part of BFD RS groups, the BFRQ is sent, and target MAC CE activation signaling is received, and before MAC CE activation signaling of a TCI state is received, receive a PDCCH according to an indication of the target MAC CE activation signaling, where the target MAC CE activation signaling is used to activate a TCI state of a CORESET, and the TCI state corresponds to a new beam; or after a beam failure occurs in a part of BFD RS groups and the BFRQ is sent, and before MAC CE activation signaling of a TCI state is received, assume that an antenna port or a CORESET-BFR of a CORESET corresponding to a BFD RS group in which a beam failure occurs has a QCL relationship with a new beam.

In some implementations, when a BFRR is not received in a preset window after the terminal reports the BFRQ including information about a new beam, a PDCCH is stilled received by using an original TCI state or an original beam; or before the terminal reports the BFRQ including information about a new beam and receives MAC CE activation signaling of a TCI state, a PDCCH is stilled received by using an original TCI state or an original beam.

In this embodiment, a beam failure recovery effect of a terminal can be improved.

In some implementations, an embodiment of the present invention further provides a terminal, including a processor 510, a memory 508, and a program or an instruction that is stored in the memory 508 and that can be run on the processor 510. The program or the instruction or is executed by the processor 510 to implement the processes of the foregoing beam failure recovery method embodiment are implemented and a same technical effect can be achieved. To avoid repetition, details are not described herein again.

An embodiment of this application further provides a readable storage medium. The readable storage medium stores a program or an instruction, and the program or the instruction is executed by a processor to implement the steps of the beam failure recovery method provided in the embodiments of this application.

An embodiment of this application further provides a program product is provided. The program product is stored in a non-volatile storage medium, and the program product is executed by at least one processor to implement the steps of the beam failure recovery method provided in the embodiments of this application.

The processor is a processor in the terminal or the network device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the beam failure recovery method provided in the embodiments of this application, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A beam failure recovery method, performed by a terminal, wherein the method comprises:

triggering a beam failure event when a beam failure occurs on all Beam Failure Detection Reference Signals (BFD RSs) in each BFD RS group in M BFD RS groups; and sending a Beam Failure Recovery reQuest (BFRQ) when the beam failure event occurs, wherein:

the BFRQ is related to the M BFD RS groups, and M is a positive integer greater than 1;

the BFRQ comprises a group identification number identifying a BFD RS group in which the beam failure event occurs;

where the triggering a beam failure event when a beam failure occurs on all Beam Failure Detection Reference Signals (BFD RSs) in each BFD RS group in M BFD RS groups comprises:

when a beam failure occurs, reporting a Beam Failure Instance (BFI) to a higher layer; and increasing a beam failure counter corresponding to one of the M BFD RS groups in which a beam failure occurs by 1, wherein when a timer corresponding to the BFD RS group in which a beam failure occurs expires, the beam failure counter corresponding to the BFD RS group in which a beam failure occurs is restarted; and the sending a Beam Failure Recovery reQuest (BFRQ) when the beam failure event occurs comprises:

sending the BFRQ when there is a beam failure counter whose value is greater than or equal to a second preset threshold in M beam failure counters configured for the terminal, wherein the M beam failure counters respectively correspond to the M BFD RS groups, and the second preset threshold of the beam failure counter corresponding to each BFD RS group is separately configured.

2. The method according to claim 1, wherein the M BFD RS groups are obtained by classifying a plurality of BFD RSs corresponding to the terminal, and that a beam failure occurs on an BFD RS means that a quality detection result of the BFD RS is worse than a corresponding first preset threshold.

3. The method according to claim 1, wherein each BFD RS group corresponds to one or more of the following configurations:
a first Physical Uplink Control CHannel (PUCCH), a Random Access CHannel (RACH) resource, or a candidate beam set.

4. The method according to claim 1, wherein the BFRQ comprises information about one or more new beams, and the one or more new beams comprise:
when the terminal is configured with one candidate beam set, one or more new beams selected from the one candidate beam set;
when the terminal is configured with M candidate beam sets respectively corresponding to the M BFD RS groups, one or more new beams selected from a candidate beam set corresponding to the BFD RS group in which the beam failure event occurs; or
when the terminal is configured with K candidate beam sets, one or more new beams selected from any candidate beam set or one or more candidate beams selected from a target candidate beam set, wherein K is greater than M, and the K candidate beam sets comprise M candidate beam sets respectively corresponding to the M BFD RS groups, wherein the target candidate beam set is a candidate beam set corresponding to a BFD RS group except a BFD RS group in which no beam failure occurs in the K candidate beam sets.

5. The method according to claim 4, wherein when the beam failure occurs in the M BFD RS groups, a maximum of M new beams are selected or a maximum of one new beam is selected; or
wherein when the terminal is configured with K candidate beam sets, when a plurality of new beams are selected, the selected new beams belong to different candidate beam sets.

6. The method according to claim 1, wherein the BFI comprises an identifier of a BFD RS group in which a beam failure occurs; and
a timer corresponding to each BFD RS group is separately configured.

7. The method according to claim 1, wherein a part of BFD RSs in the M BFD RS groups do not have a same spatial relation with a DeModulation Reference Signal (DMRS) corresponding to a COntrol REsource SET (CORESET); or
BFD RSs in a part of BFD RS groups in the M BFD RS groups do not have a same spatial relation with a DMRS corresponding to a CORESET.

8. The method according to claim 1, wherein the sending a BFRQ comprises:
sending, by using the most recently scheduled uplink data channel, a Media Access Control Control Element (MAC CE) that carries the BFRQ; or sending a Scheduling Request (SR), and sending, on an uplink data channel, a MAC CE that carries the BFRQ, wherein the uplink data channel is an uplink data channel obtained by means of scheduling by using the SR request.

9. The method according to claim 8, wherein the sending an SR comprises:
sending the SR by using a first Physical Uplink Control CHannel (PUCCH), wherein the first PUCCH corresponds to the BFD RS group in which the beam failure event occurs.

10. The method according to claim 8, wherein the terminal sends the BFRQ by using the MAC CE in a Multi-Transmission Reception Point (MTRP) configuration; or
when the terminal obtains a configuration indication of sending the BFRQ using the MAC CE, the terminal sends the BFRQ by using the MAC CE.

11. The method according to claim 1, wherein the BFRQ further comprises:
information about a Transmission Reception Point (TRP) corresponding to the BFD RS group in which the beam failure event occurs.

12. The method according to claim 1, wherein the sending a BFRQ comprises:
reporting the BFRQ by using a Random Access CHannel (RACH).

13. The method according to claim 12, wherein the sending the BFRQ by using a RACH comprises:
when the terminal finds a new beam, reporting the BFRQ by using a RACH of Contention Free Random Access (CFRA); or
reporting the BFRQ by using a RACH of Contention Based Random Access (CBRA).

14. The method according to claim 13, wherein a RACH resource of the RACH corresponds to at least one of the following:
a new beam, or the BFD RS group in which the beam failure event occurs.

15. The method according to claim 1, further comprising:
after the BFRQ is sent, determining that a Beam Failure Recovery Response (BFRR) is received in any one of the following conditions:
a preset Physical Uplink Shared CHannel (PUSCH) scheduled by a Physical Downlink Control CHannel (PDCCH) is received;
a preset PDCCH is received;
target Media Access Control Control Element (MAC CE) activation signaling is received, wherein the target MAC CE activation signaling is used to activate a Transmission Configuration Indication (TCI) state of a CORESET, and the TCI state corresponds to a new beam; or
target higher layer signaling is received, wherein the target higher layer signaling comprises setting a TCI state of a COntrol REsource SET (CORESET), and the TCI state corresponds to a new beam.

16. The method according to claim 1, wherein when the terminal is in a Multi-Transmission Reception Point (MTRP) state of Multi-Downlink Control Information (M-DCI), the method further comprises:
after the BFRQ is sent, and a preset Physical Uplink Shared CHannel (PUSCH) scheduled by a Physical Downlink Control CHannel (PDCCH) is received or a preset PDCCH is received, and before Media Access Control Control Element (MAC CE) activation signaling of a Transmission Configuration Indication (TCI) state is received, assuming that an antenna port of a Control REsource SET (CORESET) associated with a CORESET Pool Index (CORESETPoolIndex) corresponding to the BFD RS group in which the beam failure event occurs has a Quasi Co-Location (QCL) relationship with a new beam, and assuming that an antenna port for receiving a PDSCH has a QCL relationship with the new beam;

after the BFRQ is sent, and target MAC CE activation signaling is received, and before MAC CE activation signaling of a TCI state is received, determining, according to the target MAC CE activation signaling indication, a TCI state of a CORESET associated with a CORESETPoolIndex corresponding to the BFD RS group in which the beam failure event occurs, wherein the target MAC CE activation signaling is used to activate the TCI state of the CORESET, and the TCI state corresponds to a new beam;

after the BFRQ is sent, and target higher layer signaling is received, and before MAC CE activation signaling of a TCI state is received, determining, according to a parameter configuration of the target higher layer signaling, a TCI state of a CORESET associated with a CORESETPoolIndex corresponding to the BFD RS group in which the beam failure event occurs, wherein the target higher layer signaling comprises setting the TCI state of the CORESET, and the TCI state corresponds to a new beam;

after the BFRQ is sent to report a new beam, and a preset PDCCH is received, and before MAC CE activation signaling of a TCI state is received, reserving, by the terminal, only a part of CORESETs, and assuming that an antenna port of the part of CORESETs has a QCL relationship with the new beam; or after the BFRQ is sent, and before MAC CE activation signaling of a TCI state is received, assuming that an antenna port of a CORESET associated with a CORESETPoolIndex corresponding to the BFD RS group in which the beam failure event occurs has a QCL relationship with a new beam, and assuming that an antenna port for receiving a PDSCH has a QCL relationship with the new beam;

wherein when the terminal is in an MTRP state of Single Downlink Control Information (S-DCI), the method further comprises:

after the BFRQ is sent, and a preset PUSCH scheduled by a PDCCH is received or a preset PDCCH is received, and before MAC CE activation signaling of a TCI state is received, assuming that an antenna port or a Control REsource SET-Beam Failure Recovery (CORESET-BFR) of a CORESET corresponding to the BFD RS group in which the beam failure event occurs has a QCL relationship with a new beam;

after the BFRQ is sent, and target MAC CE activation signaling is received, and before MAC CE activation signaling of a TCI state is received, receiving a PDCCH according to an indication of the target MAC CE activation signaling, wherein the target MAC CE activation signaling is used to activate a TCI state of a CORESET, and the TCI state corresponds to a new beam; or after the BFRQ is sent, and before MAC CE activation signaling of a TCI state is received, assuming that an antenna port or a CORESET-BFR of a CORESET corresponding to the BFD RS group in which the beam failure event occurs has a QCL relationship with a new beam;

wherein when a Beam Failure Recovery Response (BFRR) is not received in a preset window after the terminal reports the BFRQ comprising information about a new beam, a PDCCH is stilled received by using an original TCI state or an original beam; or before the terminal reports the BFRQ comprising information about a new beam and receives MAC CE activation signaling of a TCI state, a PDCCH is stilled received by using an original TCI state or an original beam.

17. A terminal, comprising:

a memory storing computer-readable instructions; and a processor coupled to the memory and configured to execute the computer-readable instructions, wherein the computer-readable instructions, when executed by the processor, cause the processor to perform operations comprising:

triggering a beam failure event when a beam failure occurs on all Beam Failure Detection Reference Signals (BFD RSs) in each BFD RS group in M BFD RS groups; and sending a Beam Failure Recovery reQuest (BFRQ) when the beam failure event occurs, wherein:

the BFRQ is related to the M BFD RS groups, and M is a positive integer greater than 1;

the BFRQ comprises a group identification number identifying a BFD RS group in which the beam failure event occurs;

where the triggering a beam failure event when a beam failure occurs on all Beam Failure Detection Reference Signals (BFD RSs) in each BFD RS group in M BFD RS groups comprises:

when a beam failure occurs, reporting a Beam Failure Instance (BFI) to a higher layer; and increasing a beam failure counter corresponding to one of the M BFD RS groups in which a beam failure occurs by 1, wherein when a timer corresponding to the BFD RS group in which a beam failure occurs expires, the beam failure counter corresponding to the BFD RS group in which a beam failure occurs is restarted; and the sending a Beam Failure Recovery reQuest (BFRQ) when the beam failure event occurs comprises:

sending the BFRQ when there is a beam failure counter whose value is greater than or equal to a second preset threshold in M beam failure counters configured for the terminal, wherein the M beam failure counters respectively correspond to the M BFD RS groups, and the second preset threshold of the beam failure counter corresponding to each BFD RS group is separately configured.

18. The terminal according to claim 17, wherein the BFRQ comprises information about one or more new beams, and the one or more new beams comprise:

when the terminal is configured with one candidate beam set, one or more new beams selected from the one candidate beam set;

when the terminal is configured with M candidate beam sets respectively corresponding to the M BFD RS groups, one or more new beams selected from a candidate beam set corresponding to the BFD RS group in which the beam failure event occurs; or when the terminal is configured with K candidate beam sets, one or more new beams selected from any candidate beam set or one or more candidate beams selected from a target candidate beam set, wherein K is greater than M, and the K candidate beam sets comprise M candidate beam sets respectively corresponding to the M BFD RS groups, wherein the target candidate beam set is a candidate beam set corresponding to a BFD RS group except a BFD RS group in which no beam failure occurs in the K candidate beam sets.

* * * * *